United States Patent [19]
Wasinger

[11] 3,750,515
[45] Aug. 7, 1973

[54] SHEARING APPARATUS

[76] Inventor: Fidelis J. Wasinger, 1972 S. Parker Rd., Denver, Colo. 80222

[22] Filed: Dec. 28, 1970

[21] Appl. No.: 102,024

Related U.S. Application Data

[62] Division of Ser. No. 789,764, Jan. 8, 1969, Pat. No. 3,615,084.

[52] U.S. Cl..................... 83/599, 83/356.3, 83/395
[51] Int. Cl............................................. B23d 17/06
[58] Field of Search........................ 83/32, 906, 923, 83/694, 597–606, 610, 611, 612, 355, 622, 395, 356.3

[56] References Cited
UNITED STATES PATENTS

| | | | |
|---|---|---|---|
| 3,561,308 | 2/1971 | Ehrlich | 83/906 X |
| 2,655,213 | 10/1953 | Anderson | 83/906 X |
| 3,587,373 | 6/1971 | Astrand | 83/906 X |
| 2,635,693 | 4/1953 | Gibby | 83/355 |
| 3,240,094 | 3/1966 | Endert | 83/694 X |

Primary Examiner—J. M. Meister
Attorney—Sheridan, Ross & Fields

[57] ABSTRACT

Process and apparatus for salvaging bulky junk material of principally ferrous content characterized by crushing to predetermined thickness and thence shearing same into relatively small rectangular pieces, continuously conveying the pieces through a furnace to combust entrained combustible materials and separate, by melting, non-ferrous metals, resulting in a final ferrous product for subsequent refining which contains a minimum of contaminants to be removed in the refining process. Optionally, undesired combustible air pollutants formed in the furnace are also oxidized before discharge into the atmosphere to thus permit practice of the invention in loci where air pollution is not tolerated.

3 Claims, 10 Drawing Figures

Patented Aug. 7, 1973

Patented Aug. 7, 1973

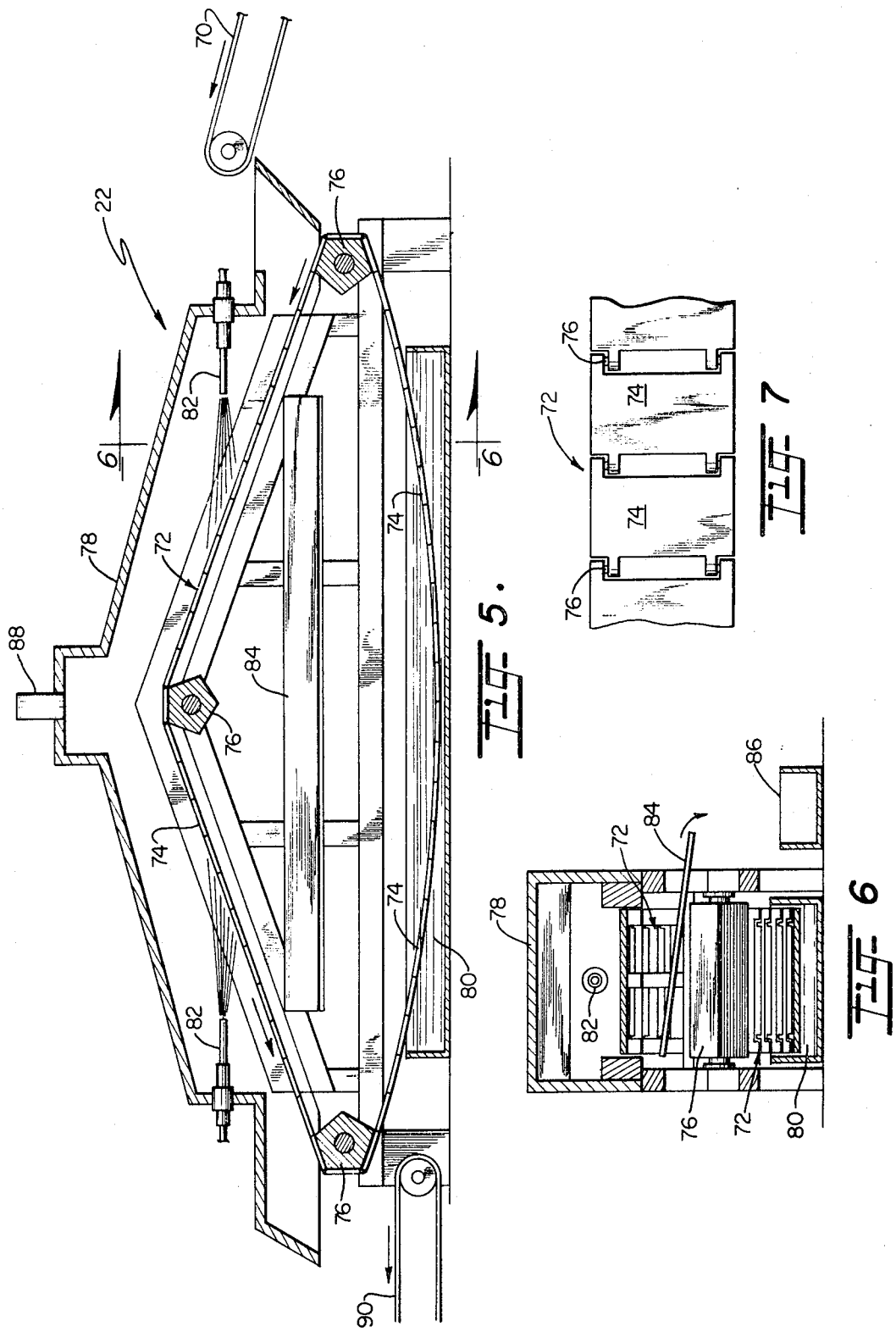

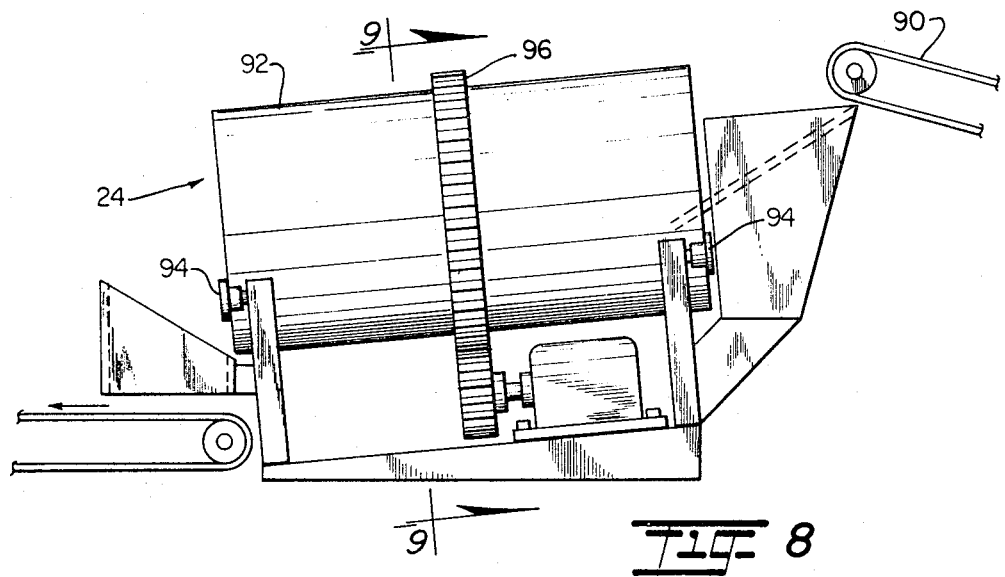
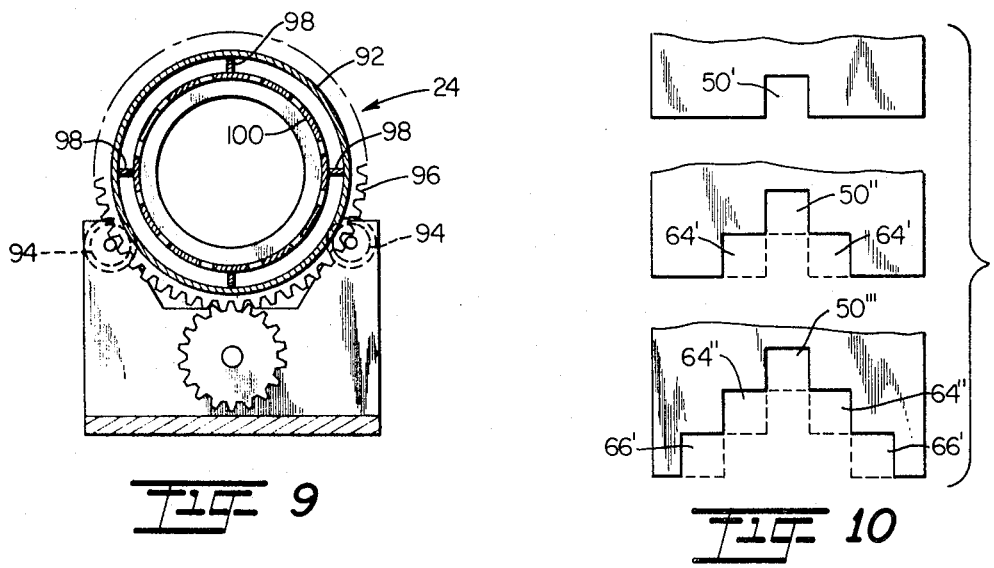 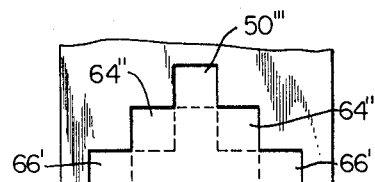

SHEARING APPARATUS

This is a division of application Ser. No. 789,764, filed Jan. 8, 1969, now U.S. Pat. No. 3,615,084.

BACKGROUND OF THE INVENTION

Ferrous junk material is of myriad sorts but could possibly be categorized as falling within two general classes, the first being dense, relatively uncontaminated material such as structural steel shapes, forgings, castings and the like which may be readily and economically refined and the second being bulky materials, mainly ferrous, but containing undesired metals or other inclusions which render the refining process considerably less economical and in some instances unfeasible. Junk automobiles and certain household appliances, such as refrigerators, stoves, textile washing and drying machines and the like form a vast supply within this class. It has also been recognized that within the latter class it is more economical to separate the more dense materials from the bulky materials and refine same by separate process. Thus, in automobile salvage, it has been common practice to remove engines, transmissions, sometimes differential housings and their contents, and process these parts in suitable refining furnaces. Radiators are also usually removed because of the relatively high value of their brass content, and sometimes wheels which are removeable with minimum effort and constitute high grade uncontaminated steel. The separation of the myriad of other parts, however, presents a different problem in that costs of disassembly, lack of marketability and other considerations render this procesure economically unfeasible. This has resulted in huge stock piles of junk of this class about the countryside, mainly near large cities, but also elsewhere, waiting to be crushed for more readily transportation to a refinery or to a dumping site. If dumping is the final solution, and particularly near large cities, the cost of this type of disposal can well far exceed the value of the metal content.

The economics of salvage of such bulky materials is complex. Cost of transportation is an important factor and this does not usually depend upon weight but rather upon volume of the material. Crushing to minimum size has thus been recognized as probably the most important requirement for minimizing this factor. Cost of transportion also depends on distance hence it could be economically feasible to transport low grade junk to a nearby refinery whereas the same material could not be transported beyond a certain distance. In this connection it is to also be recognized that steel refineries, such as open hearth furnaces and others are generally concentrated in relatively few locations, and in general, the transporation distance will usually be considerable.

Certain of the economic problems referred to have been recognized for quite some time. The U.S. Pat. No. to Gregg, 2,059,229, for example, recognizes the desirability of producing "clean" scrap and also reducing its bulk. Certain selected materials such as automobile fenders were processed, however, in contradistinction to an entire automobile body and chassis containing a conglomeration of materials, many of which were undesired in a refining process.

The U.S. Pat. Nos. to Gates 3,103,163 and Patros et al. 2,986,992 also recognize the need for compaction wherein an entire automobile body is reduced to relatively small volume. The U.S. Pat. No. to Davis, Jr. 3,237,554 is of like nature, adding the concept of rendering the device portable. Thus, the device could be transported to the site or source of junk rather than vice versa. Another concept is disclosed in the U.S. Pat. No. to Smiltnick 3,273,493 wherein an automobile body is not only crushed or compacted but also sheared into strips equal to the width of same.

While the exemplary prior art contains certain concepts for the more economical salvage of junk material of the bulky class, certain concepts apparently were not recognized amongst which are:

1. Elimination of contaminants from the processed scrap and at the situs of processing whereby it resulted in clean or grade A steel scrap which would command a higher price and thus render the salvage operation more economically feasible;

2. Elimination of non-ferrous metals from the processed scrap which, in general, were a detriment to the refinery but which had added value if they could be recovered and sold separately;

3. Shearing of the scrap into relatively small pieces of uniform size which facilitates processing with less bulky equipment requiring less land area for operation and which results in final processed scrap which may be more readily handled, transported, and charged into a refining furnace; and 4. Partially processing the scrap at numerous loci, near the respective supplies without substantial air pollution, in contradistinction to complete processing at a few loci, with the attendent increase in air pollution concentration.

The principal objects of this invention are thus the provision of process and apparatus for processing bulky ferrous junk material in a more economical manner and the fulfillment of the concepts just referred to, together with others as will subsequently appear as the description proceeds.

BRIEF DESCRIPTION OF THE DRAWINGS

FIG. 5 is a longitudinal central section through a furnace and incinerator;

FIG. 6 is a vertical section taken on line 6—6, FIG. 5;

FIG. 7 is a plane view of a portion of a conveyor belt shown in FIGS. 5 and 6;

FIG. 8 is a side elevation of a tumbler;

FIG. 9 is a vertical section taken on line 9—9, FIG. 8; and

FIG. 10 illustrates, from top to bottom, a sequence of shearing material.

DESCRIPTION OF THE PREFERRED EMBODIMENT

Figure 1:
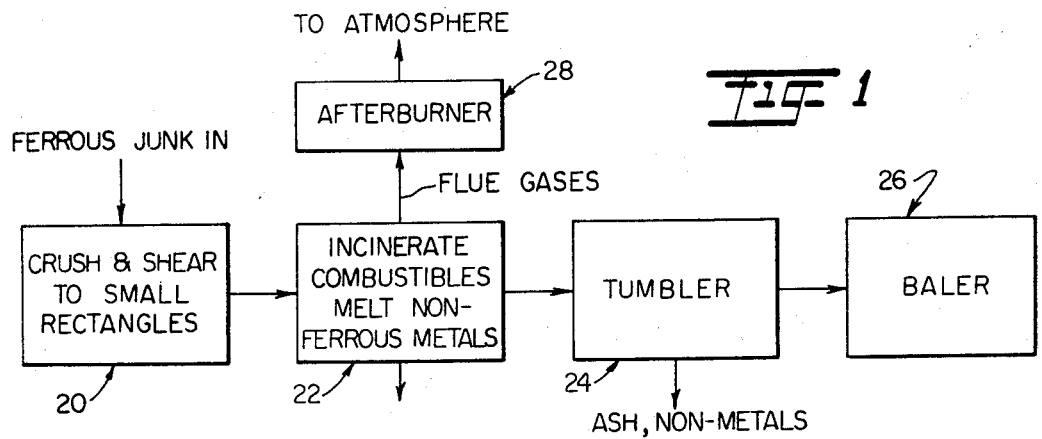
FIG. 1 schematically illustrates process and apparatus for practicing the subject invention.

Referring now to the drawings and first to FIG. 1, the invention comprises, briefly, a crusher and shear 20, a furnace and incinerator 22, and a tumbler 24, the material to be processed passing through these components in the order named. Optional components include a baler 26 and an afterburner 28, the baler being employed when it is desired to package the processed material in bound bales form and the afterburner being employed in loci where air pollution is not tolerated.

Figure 2:
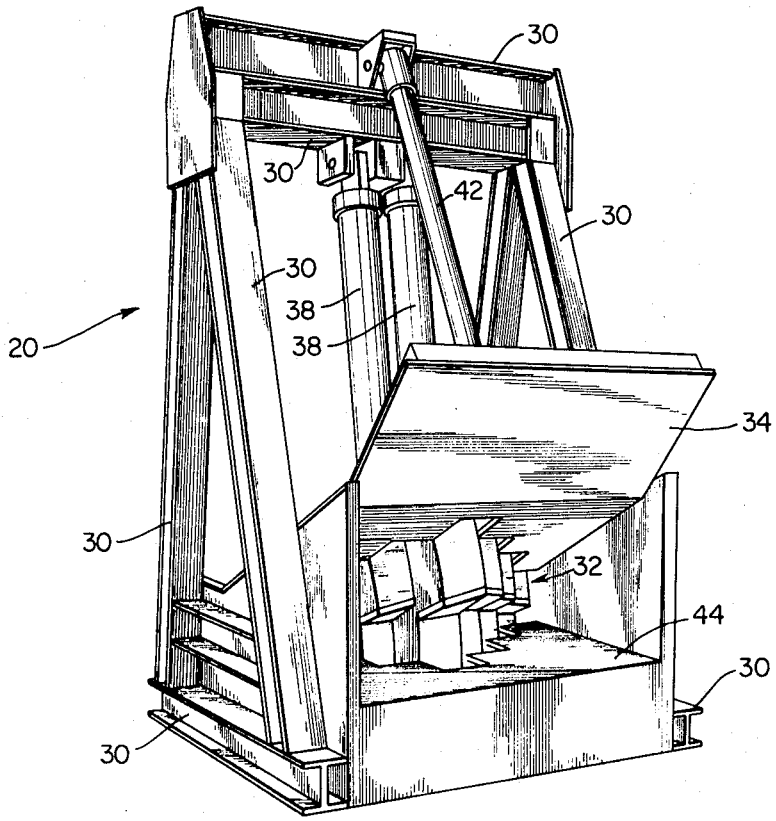
FIG. 2 is an isometric view of a crusher and shear, a portion being omitted for purpose of clarity.
Figure 4:
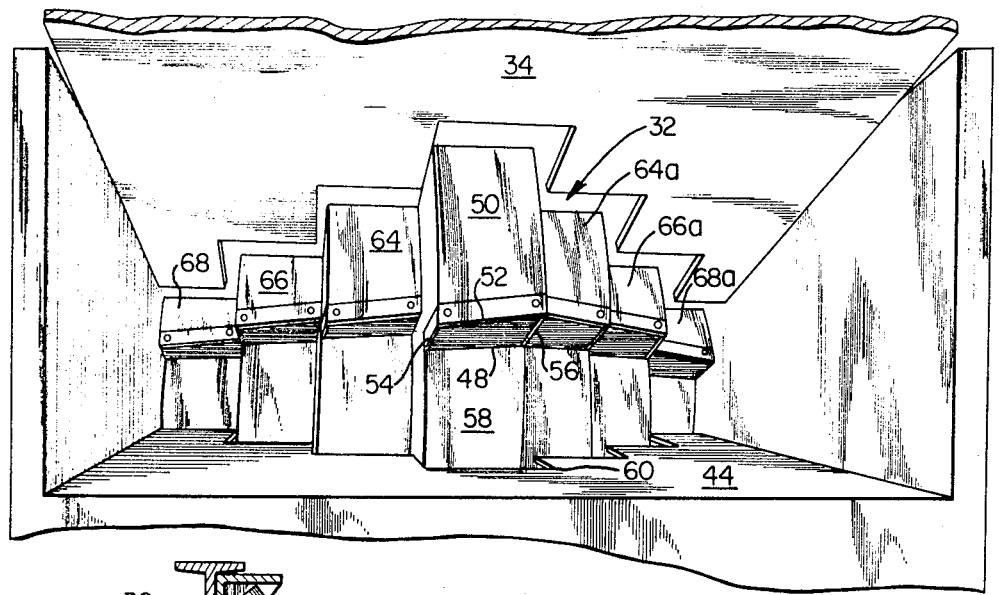
FIG. 4 is a detail of the crusher and shear as viewed in the direction of arrow 4, FIG. 3.
Figure 3:
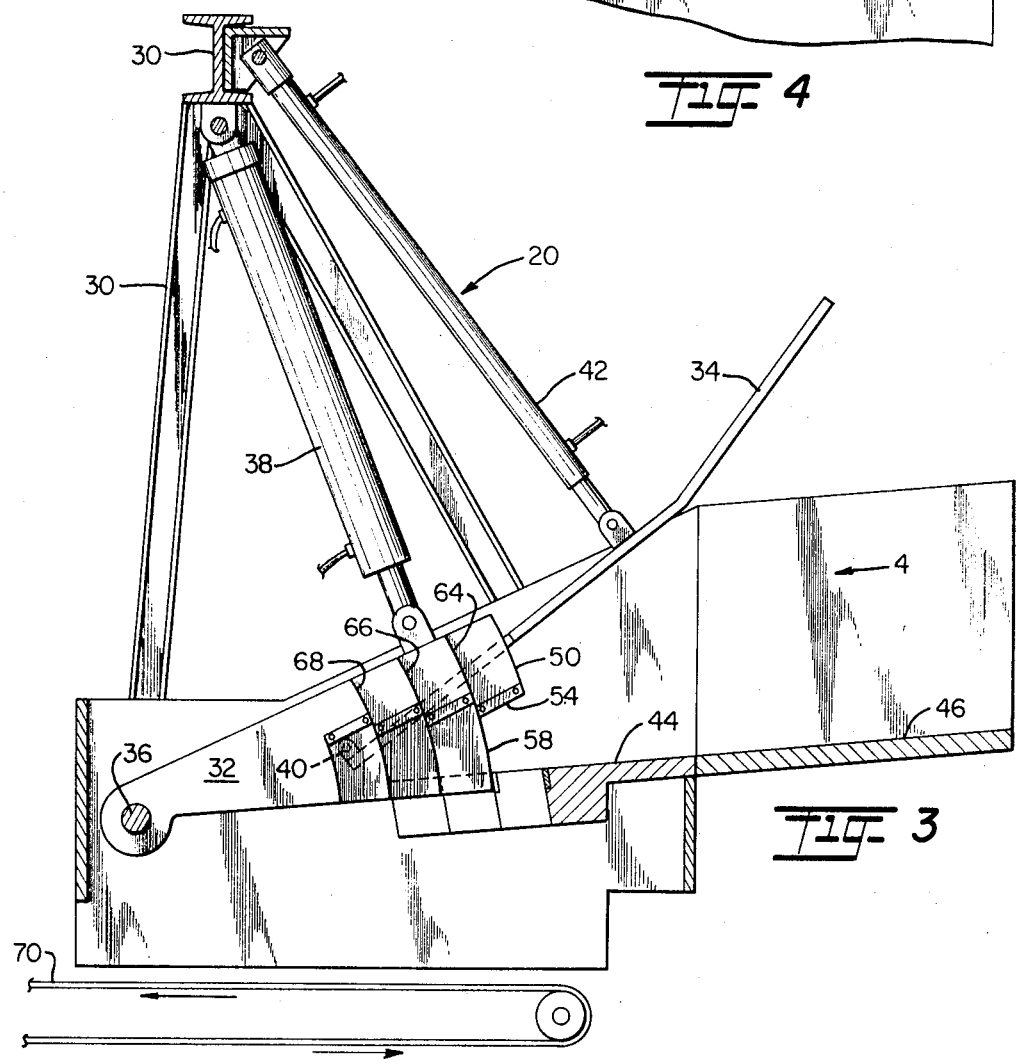
FIG. 3 is a longitudinal view, in partial section through the crusher and shear of FIG. 2 and also showing the portion omitted therefrom.

Referring now to FIGS. 2, 3 and 4, crusher and shear 20 comprises, in general, a frame 30, a male shear member 32 and a crusher plate 34. Shear member 32 is secured to the frame 30 by a pivot pin 36 (see FIG. 3) and is angularly oscillatable by a pair of double acting hydraulic rams 38,38. The crusher plate 34 is similarly secured to the frame 30 by pivot pins 40 adjacent each side edge of same, and is angularly oscillatable by a like double acting hydraulic ram 42. A female shear plate or platen 44 is rigidly secured to the frame 30 and is disposed at a downwardly inclined angle so that material may move by gravity along same. A ramp 46, shown in FIG. 3 but omitted in FIG. 2, forms a continuation of the shear plate 44 and along which material, such as an automobile, may slide beneath the male shear member 32. As will be apparent, when ram 42 is extended it will crush the material to a desired thickness so that it may move beneath the male shear member 32.

As best shown in FIGS. 3 and 4, male shear member 32 is formed from a plurality of arcuate sections which are angularly stepped about the axis of pivot pin 36 and also stepped in outward and rearward directions. As better shown in FIG. 4, the rear edge 48 of central shear blade 50 lies substantially in a plane which contains the axis of pin 36. Front edge 52, however, lies in a plane canted to the plane of rear edge 48 and the side edges 54,56 join the respective ends of edges 48,52. Side edge 54 is non-radial to the axis of pin 36 and edge 56 is also non-radial, but to a greater extent. The construction can be better visualized by its manner of operation. Assuming that material has been crushed and fed into the oscillatable shear member until it abuts rearwardly stepped portion 58 of the central blade, the male shear member is actuated. The cuts start at the rear where edge 48 intersects edges 54 and 56. They then advance forwardly along edges 54 and 56 and then along edge 52 from left to right, terminating when the intersection of edges 52,56 meet the plane of shear plate 44 at corner 60. It is thus apparent that both side edge cuts start at the rear at the same time but due to the warped shape of the lower surface of the shear blade the cut along edge 54, from rear to front, leads the similar cut along edge 56, and final shearing occurs when the intersection of side edge 56 and front edge 52 reach corner 60. As distinguished from a shear or punch in which the entire periphery of same is shearing at the same time, the shearing action is distributed in a manner to advance gradually around the periphery and thus distribute the total shearing work over a greater movement of the shear blade, thus reducing the power requirements and also reducing the stress loading of the apparatus.

Assuming now that a first central cut 50' has been made as illustrated in FIG. 10, the male shear member 32 is then raised, the crusher plate 34 raised, and the material fed into the shear member for the second cut, the crusher plate again being lowered. Upon descent of the shear member this removes another rectangular piece 50". The material, however, is now in the path of adjacent male shear blades 64,64a which are constructed like central shear blade 50 except that their side edges approach lines radial to the axis of pin 36 as illustrated in FIG. 3. As will be apparent, shear blades 64,64a angularly lag central shear blade 50 so that piece 50" is substantially cut out before shear blades 64,64a engage the material. When this occurs, however, pieces 64',64' are sheared from the material. During the next cut, a new central cut 50''' is first made followed by cuts 64",64" and then followed by cuts 66',66' made by shear blades 66,66a. In the next operation the cuts further proceed into the length of the material as described, shear blades 68,68a making cuts adjacent the edges of same (not illustrated). The operation continues in like manner as the material is fed into the shear member until the central shear blade 50 makes its last cut at the rear edge of the material which severs it into two pieces, the pieces being fed in like manner until they have been sheared into rectangles. It will now be apparent that with the exception of the initial cut by central shear blade 50, only two rectangular pieces are sheared at one time.

Shear blades 50, 64,64a, etc. are preferably of soft steel, the edges of which are provided with hardened removeable shear plates as is conventional in the shear art. As will be apparent from FIG. 4, shear blade 50 is provided with such plates along its front and side edges but adjacent shear blades 64,64a and next adjacent shear blades 66,66a require such plates along the front edge and only one side edge. The outermost shear blades 68,68a each require a plate only along its front edge.

As the rectangular pieces are sheared they fall onto a conveyor belt 70 (see FIGS. 3 and 5) and are transported to the furnace and incinerator 22 illustrated in FIGS. 5, 6 and 7. This comprises an endless belt 72 formed of steel plates 74, hinged together by pivot pins 76 and trained about flat sided rolls 76, illustrated as pentagonal, the length of a flat side being approximately equal to the distance between adjacent hinge pins 76. This construction, in effect, provides a sprocket-like drive. One or more of the rolls may be power driven in any suitable manner. The endless belt 72 is disposed within a casing 78 and as will be apparent has an upwardly inclined run, a downwardly inclined run and a lower sagging run which passes through a water trough 80 to maintain it within permissible temperature limits. Suitable burners 82,82 are provided to heat the sheared material as it is transported along the upper runs. An inclined floor 84 is disposed beneath the upper runs onto which melted metal, such as zinc die castings, may run and be discharged into a container 86. During passage through the furnace-incinerator, meltable non-ferrous metals are thus recovered and combustibles are incinerated, ash, glass and other undesired materials remaining with the material to be removed as will subsequently be described.

Flue gases from the furnace pass through a conduit 88 and are preferably delivered to an afterburner illustrated schematically in FIG. 1. This device is, in the main, a combustion chamber and a blower for adding air to the flue gas to render it sufficiently oxygen rich or over rich to thus combust combustibles which are exhausted from the furnace to thus minimize or prevent pollution of the atmosphere.

As previously referred to, the material delivered from the furnace still contains certain unwanted contaminents, the removal of which is effected in a tumbler 24 to now be described. Referring to FIGS. 8 and 9, conveyor belt 90 transports the material to tumbler 24 which is preferably formed with an outer imperforate cylinder or drum 92, journaled on rolls 94 and driven by a ring gear 96 or a sprocket and chain. Webs 98 support an inner concentric perforate drum 100. In the operation of the tumbler 24, material delivered to same is agitated as it gravitates toward its lower end removing ash and other unwanted materials of a size which may pass through the openings in same. The purpose of the outer imperforate cylinder is to prevent loss of elongated steel pieces of a size which may partially pass through the inner drum. Thus, if a piece of such size partially passes through the inner drum it will fall back into same when elevated toward the top of the drum and eventually be recovered at the tumbler discharge end along with the steel pieces from which unwanted material has been removed.

As previously set forth in detail, shear member 32 is mounted for pivotal movement about pin 36 and is angularly oscillatable in opposite directions by rams 38. This provides an economical and relatively light weight construction since the force applied by the rams is generally aligned with the shearing forces applied to the material and thus minimizes torque forces on the shear member, supporting arm. It is to be understood, however, that the arm may be constructed with increased strength and rigidity so that it may be oscillated by a torque force applied about the axis of pin 36. Also, two or more angularly related arms, each carrying a set of shear blades, may be employed and this construction continuously rotated, the material being successively fed during the intervals between shearing action. Further, if it is desired to provide the shear member with suitable guides for rectilinear movement it may be oscillated in a straight line by a suitable actuator such as a hydraulic ram. In either of the alternative forms just referred to the shearing blades preferably retain their same warped shape and progressive shearing action about their peripheries as described and illustrated in the exemplary embodiment.

It is to be understood that this invention is not limited to the exact embodiment of the process and apparatuses shown and described, which are merely by way of illustration and not apparent to those skilled in the art.

I claim:

1. Shearing apparatus for use in salvaging metals from bulky compressible junk material, such as automobiles, household appliances, and the like, containing ferrous sheet and frame members, which material has been compacted prior to being fed to the shearing apparatus, said apparatus comprising:
    a. an angularly oscillatable shear member having a central shear blade with a rectangular shearing face,
    b. a plurality of pairs of like shear blades disposed symmetrically at each side of same, each pair having faces which are successively stepped in a rearward direction and also successively angularly stepped,
    c. the construction being such that during oscillation of the shear member the central blade first shears a rectangular piece from the material, adjacent pairs next shear a pair of like pieces from the material, and next adjacent pairs next shear another pair of like pieces from the material, whereby shearing action is limited at any one time to not to exceed one pair of shear blades.

2. Apparatus in accordance with claim 1 wherein each rectangular shearing face is formed as a warped surface to effect progressive shearing around edges of its periphery, whereby one edge of the periphery completes shearing action ahead of an adjacent edge.

3. Apparatus in accordance with claim 1 including at least one double acting hydraulic ram operatively connected to the shear member for oscillating same.

* * * * *